United States Patent
Shiozawa

(10) Patent No.: US 7,075,889 B2
(45) Date of Patent: Jul. 11, 2006

(54) PACKET PROTECTION TECHNIQUE

(75) Inventor: Kenichi Shiozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 776 days.

(21) Appl. No.: 09/740,993

(22) Filed: Dec. 21, 2000

(65) Prior Publication Data

US 2001/0005358 A1    Jun. 28, 2001

(30) Foreign Application Priority Data

Dec. 22, 1999 (JP) ................................. 11-364990

(51) Int. Cl.
*H04L 12/26* (2006.01)
(52) U.S. Cl. ...................... 370/228; 370/225; 370/389; 370/392
(58) Field of Classification Search ........ 370/216–228; 709/239; 379/221.01
See application file for complete search history.

(56) References Cited

U.S. PATENT DOCUMENTS

| | | | | |
|---|---|---|---|---|
| 6,154,448 A | * | 11/2000 | Petersen et al. | ............ 370/248 |
| 6,215,765 B1 | * | 4/2001 | McAllister et al. | ......... 370/217 |
| 6,343,067 B1 | * | 1/2002 | Drottar et al. | .............. 370/231 |
| 6,363,319 B1 | * | 3/2002 | Hsu | ........................... 701/202 |
| 6,400,681 B1 | * | 6/2002 | Bertin et al. | ................. 370/218 |
| 6,442,132 B1 | * | 8/2002 | Burns et al. | ................. 370/218 |
| 6,532,088 B1 | * | 3/2003 | Dantu et al. | .................. 398/43 |
| 6,535,481 B1 | * | 3/2003 | Andersson et al. | ......... 370/225 |
| 6,697,329 B1 | * | 2/2004 | McAllister et al. | ......... 370/235 |
| 6,721,269 B1 | * | 4/2004 | Cao et al. | .................... 370/227 |
| 6,813,242 B1 | * | 11/2004 | Haskin et al. | .............. 370/229 |
| 6,925,054 B1 | * | 8/2005 | Atterton et al. | ............. 370/218 |
| 2002/0060986 A1 | * | 5/2002 | Fukushima et al. | ......... 370/218 |

FOREIGN PATENT DOCUMENTS

| | | |
|---|---|---|
| JP | 11-261620 | 9/1999 |
| JP | 2000-174815 | 6/2000 |

* cited by examiner

*Primary Examiner*—Seema S. Rao
*Assistant Examiner*—Michael J. Moore
(74) *Attorney, Agent, or Firm*—Sughrue Mion, PLLC

(57) ABSTRACT

A packet protection method allowing rapid restoration in case of fault occurrence without undesired reduction in efficiency on the use of network bandwidth is disclosed. In a packet protection network having a working route and a reserved route set therein, when a failure occurs, a router on the working route sends an incoming packet to be protected back to the ingress router. The ingress router forwards the packet to be protected to the reserved route so that the packet to be protected travels through the reserved route around the failure.

11 Claims, 8 Drawing Sheets

FIG. 5
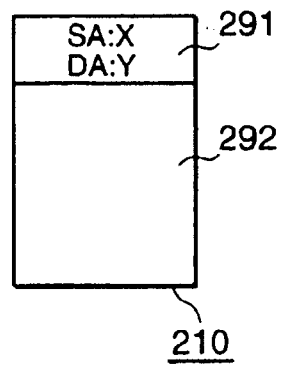
FIG. 6
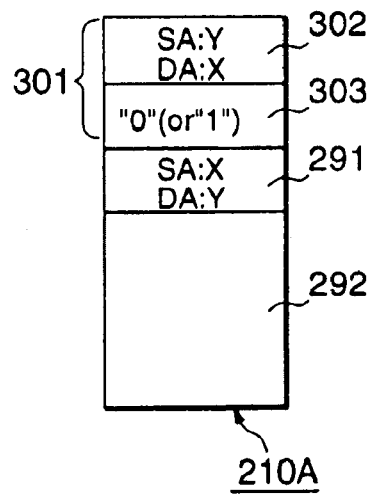
FIG. 7
| PROTECTED FLOW INFORMATION | WORKING ROUTE INFORMATION | RESERVED ROUTE INFORMATION |
|---|---|---|
| SA:X,DA:Y | B | NONE |
| SA:Y,DA:X | X | D |
| ⋮ | ⋮ | ⋮ |

FIG. 9

| PROTECTED FLOW INFORMATION | ROUTE INFORMATION | PROTECTION INFORMATION |
|---|---|---|
| SA:X,DA:Y | C | YES |
| SA:Y,DA:X | A | NO |
| ⋮ | ⋮ | ⋮ |

321 325 326 251B

PACKET PROTECTION TECHNIQUE

BACKGROUND OF THE INVENTION

1. Field of the Invention

The present invention generally relates to restoration strategies in a packet transfer network composed of a plurality of routers, and in particular to a method and system for restoring data transmission when a fault occurs on a transmission line between routers.

2. Description of the Related Art

There have been proposed restoration strategies for a packet transfer network composed of a plurality of routers, typically, the Internet. An example of a basic restoration method is to switch an initial route to a restored route when a failure has been detected between routers in the initial route. Such a basic restoration method needs to find a new route as an alternative route at its endpoint router by searching its routing table which is being updated according to the routing protocol. Accordingly, it will take much longer until restoration. It is difficult to put it in practical use especially in the field of real-time data transmission such as voice and video data transmission.

As another example of restoration technique, a router network having a proxy router has been disclosed in Japanese Patent Application Unexamined Publication No. 11-261620. The network environment of a LAN belonging to a router is previously copied to another router When a failure occurs at the router, the other router serves as a proxy router of the failed router so that communications of the LAN belonging to the failed router can be maintained.

It is possible to apply the line protection technique employed in SONET/SDH (Synchronous Optical NETwork/Synchronous Digital Hierarchy) to the packet transfer network. More specifically, the same signal is transferred through both of working and protection lines. In case of working line cut or node failure, the same signal on the protection line can be transmitted to a destination node. However, all information are transferred through both working and protection line independently of its degree of importance, resulting in reduced efficiency on the use of the link bandwidth.

Recently, to protect connections for packet communications, there has been proposed a protection and restoration strategy using a 1+1 protection method and a packet flow selector in Japanese Patent Application No. 10-349220 filed on Dec. 9, 1998 (Unexamined Publication No. P2000-174815A published on Jun. 23, 2000). According to this strategy, when a packet carries important information, the packet is duplicated and the duplicate packets are transferred through different routes. At the receiving node, the first arrival of the packet is used and the other duplicate packet is discarded. Such a strategy can avoid causing important information to be lost due to link failure.

However, the duplicate important packets flow through the network at all times. Therefore, the greater the amount of important information, the greater the amount of packet flow to be protected. This causes the efficiency on the use of the network bandwidth to be reduced.

SUMMARY OF THE INVENTION

An object of the present invention is to provide a packet protection method and system which can achieve rapid restoration in case of fault occurrence without undesired reduction in efficiency on the use of network bandwidth.

According to an aspect of the present invention, a restoration method for restoring a flow of packets in a packet transfer network composed of a plurality of routers, includes the steps of: a) setting a working route and a reserved route in the packet transfer network, wherein the reserved route branches from the working route at a start-point router; at each of routers other than the start-point router on the working route, b) determining whether a failure occurs in a link to a next-hop router on the working route; c) determining whether an incoming packet is to be protected: d) when a packet to be protected is received in case of occurrence of the failure, sending the packet to be protected back to the start-point router: and at the start-point router, e) when receiving back the packet to be protected, forwarding it to the reserved route. When the start-point router receives a packet to be protected in case of occurrence of the failure, the start-point router forwards it to the reserved route.

The working and reserved routers may be set by a network management server controlling each of the routers in the packet transfer network.

The step (d) may include the steps of: d.1) when a packet to be protected is received in case of occurrence of the failure, adding a protection control header to the packet to be protected to produce a return packet; and d.2) sending the return packet back to the start-point router. The step (e) may include the steps of: e.1) receiving the return packet back from a next-hop router on the working route: e.2) removing the protection control header from the return packet to produce an original packet to be protected; and e.3) forwarding the original packet to the reserved route, According to another aspect of the present invention, a packet transfer network includes; a plurality of routers; and a network management server for designing a packet protection network in which a working route and a reserved route are set by controlling designated routers which are involved in the working and reserved routes, wherein the reserved route branches from the working route at a start-point router. Each of a plurality of designated routers forming the working route, includes: a line failure detector for detecting a failure occurring in a link to a next-hop router on the working route; a table for storing information indicating where a packet to be protected is forwarded to; and a packet distribution controller for, when a packet to be protected is received in case of occurrence of the failure, forwarding the packet to be protected depending on the information stored in the table. The designated routers other than the start-point router forwards the packet to be protected back to the start-point router in case of occurrence of the failure, wherein the start-point router forwards the packet to be protected received back from another router to the reserved route.

The start-point router may be an ingress router to the packet protection network. The network management server may transfer the information of the table to each of the designated routers depending on which one of the start-point router and a transit router the designated router is.

According to further another aspect of the present invention, in a packet protection network in which a working route and a reserved route are set by controlling designated routers which are involved in the working and reserved routes, wherein the reserved route branches from the working route at a start-point router, a router includes: a line failure detector for detecting a failure occurring in a link to a next-hop router on the working route; a table for storing information indicating where a packet to be protected is forwarded to; and a packet distribution controller for, when a packet to be protected is received in case of occurrence of the failure, forwarding the packet to be protected depending on the information stored in the table, wherein the designated routers other than the start-point router forwards the packet to be protected back to the start-point router in case of occurrence of the failure, wherein the start-point router forwards the packet to be protected received back from another router to the reserved route.

BRIEF DESCRIPTION OF THE DRAWINGS

FIG. 5 is a diagram showing a format of a normal packet;

FIG. 6 is a diagram showing a format of a packet sent back to the ingress router in case of failure occurrence;

FIG. 7 is a diagram showing a packet protection information management table in the ingress router;

FIG. 9 is a diagram showing a packet protection information management table in a router located in a transit section of the packet protection network.

DETAILED DESCRIPTION OF THE PREFERRED EMBODIMENT

SYSTEM CONFIGURATION

Figure 1:
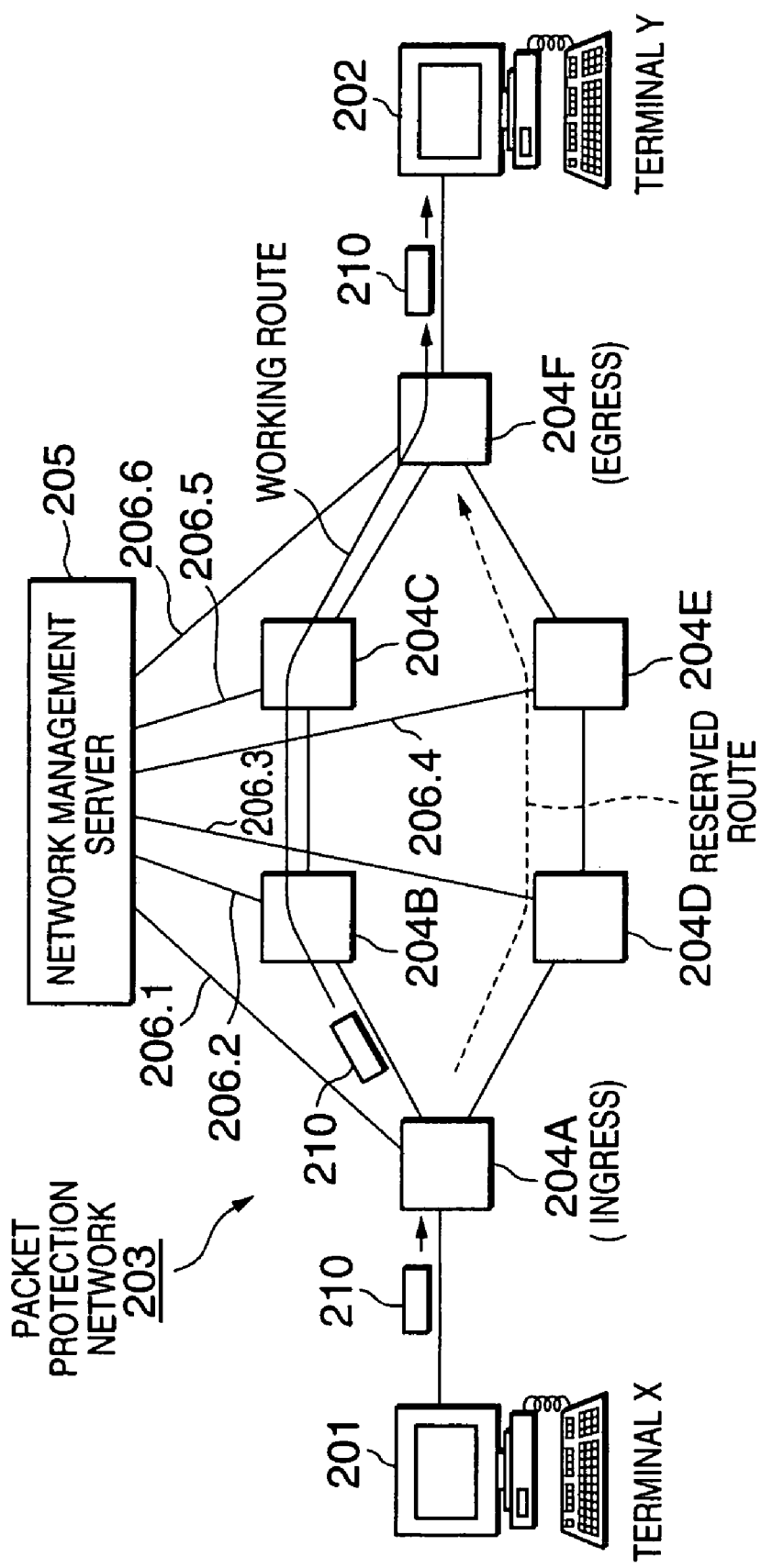
FIG. 1 is a schematic diagram showing an example of the configuration of a packet protection network according to an embodiment of the present invention.

As shown in FIG. 1, it is assumed for simplicity that a transmission line restoration system according to an embodiment of the present invention is composed of a sending terminal (X) 201, a receiving terminal (Y) 202, a packet protection network 203 composed of routers 204A–204F, and a network management server 205.

The sending terminal 201 is connected to the router 204A, in this example, which is the ingress to the packet protection network 203. The receiving terminal 202 is connected to the router 204F, in this example, which is the egress from the packet protection network 203. The routers 204A–204F are connected to the network management server 205 through respective ones of control lines 206.1 through 206.6, which may be dedicated lines or be implemented by using an existing network to transfer control data to them.

It is further assumed that the packet protection network 203 has a working route from the router 204A to the router 204F through the routers 204B and 204C and a reserved route from the router 204A to the router 204F through the routers 204D and 204E. In this example, the respective routers 204A and 204F are also a start-point router and an end-point router of the working and reserved routes.

The network management server 205 manages the packet protection network 203. In addition, the network management server 205 manages other packet protection networks (not shown). In other words, the network management server 205 manages the routers 204A–204F so as to implement not only the packet protection network 203 but also the other packet protection networks. Accordingly, the routers 204a–204F may have the same basic circuit configuration so as to function the present embodiment.

A packet protection network is a network to which packet protection is applied and, more specifically, "packet protection network" is defined as a network in which, in case of failure occurrence in an initial route, packets to be protected among packets 210 are transferred from the ingress around the failure to the egress but other packets are not protected. Therefore, packets conveying very important data such as medical data of an operation on a patient are protected so as to travel around the failure location to the egress router. On the other hand, packets conveying relatively low degrees of importance are not protected, so that these packets may be discarded in case of failure occurrence.

In FIG. 1, in the case where another packet protection network is set or other sending and receiving terminals are determined, two routers other than routers 204A and 204F may be the ingress and egress, respectively. For example, if a sending terminal is connected to the router 204B, then the router 204B becomes the ingress of a corresponding packet protection network. Further, the sending and receiving terminals 201 and 202 may be connected to respective ones of the routers 204A and 204F via another packet protection network.

NETWORK MANAGEMENT SERVER

Figure 2:
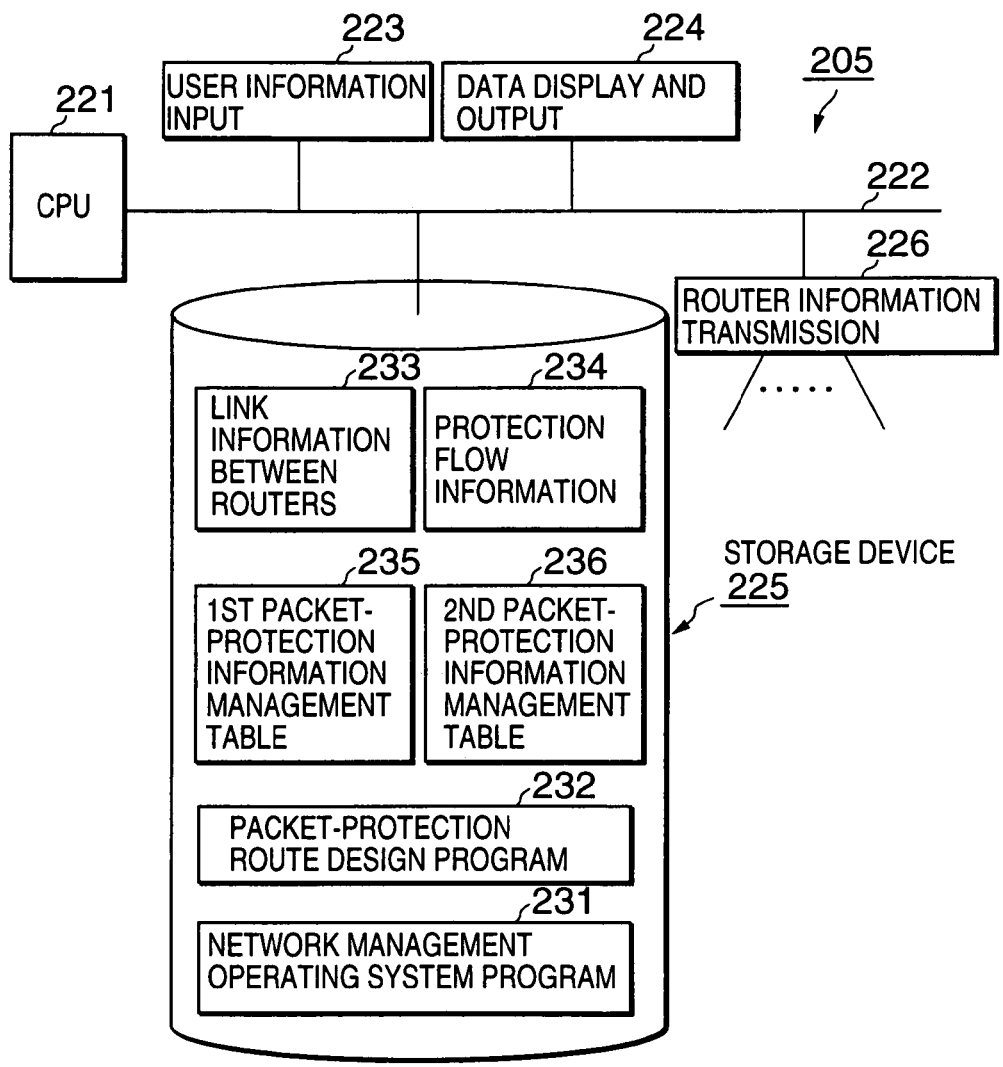
FIG. 2 is a block diagram showing a network management server, in the embodiment.

Referring to FIG. 2, the network management server 205 has a processor (CPU) 221 therein, which is connected to a user information input section 223, a data display and output section 224, a storage device 225, and a router information transmission section 226 through a bus 222 such as data bus.

The user information input section 223 is composed of a data input interface circuit and input device such as keyboard or pointing device, a floppy disk drive, or an input device for inputting data through a network. A network manager (user) uses the user information input section 223 to enter various kinds of fundamental data for the failure restoration system.

The data display and output section 224 is composed of data display and output interface circuit, a display such as CRT or LCD, and a printer. The display and printer may be omitted if they are not needed to operate the system.

The storage device 225 is composed of a recording medium such as a hard disk, an optical disk, or a random access memory, and a necessary drive interface circuit. The storage device 225 has a plurality of memory areas 231–236 for storing various kinds of information as described hereafter.

The memory area 231 stores a network management operating system program for operating the network management server 205. The memory area 232 stores a packet-protection route design program for designing an alternative route to perform packet protection. The memory area 233 stores inter-router link information that is link information for each router, which has been inputted by the user operating the user information input section 223. The memory area 234 stores protection flow information regarding flows to be packet-protected, which has been inputted by the user operating the user information input section 223.

The memory area 235 stores a first packet-protection information management table containing information regarding an ingress router (e.g. router 204A) to each of the packet protection networks including the packet protection network 203.

The memory area 236 stores a second packet-protection information management table containing information regarding a transit router (e.g. routers 204B–204E) to each of the packet protection networks including the packet protection network 203.

The packet-protection route design program stored in the memory area 232 is executed on the processor 221 to determine how to transfer packets to the egress for each flow and which router is to be selected to transfer packets to the egress in case of failure occurrence based on the inter-router link information stored in the memory area 233 and the protection flow information stored in the memory area 234. The first and second packet-protection information management tables 235 and 236 are updated in response to the route design determined by the packet-protection route design program. The information contained in the first and second packet-protection information management tables 235 and 236 are transferred to each of the routers 204A–204F through a corresponding control line.

In this manner, packets that are previously designated by the user information input section 223 are transferred through the actual network under the network environment designed by the packet-protection route design program stored in the memory area 232.

ROUTER

As described before, the routers 204A–204F have the same basic circuit configuration. Here, taking the router 204A as an example, the internal circuit configuration of a router will be described hereafter.

Figure 3:
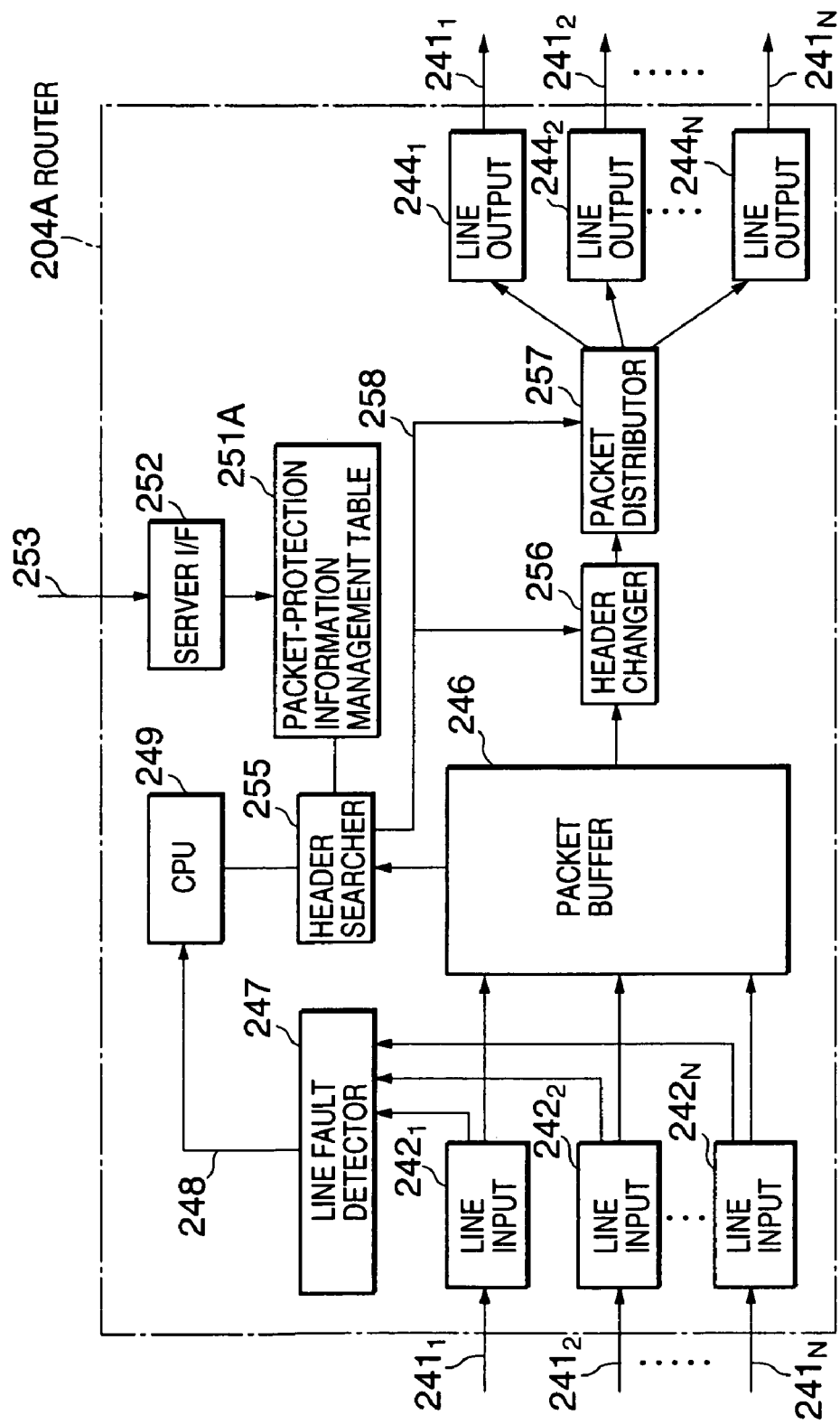
FIG. 3 is a block diagram showing a router in the embodiment.

Referring to FIG. 3, the router 204A is connected to N transmission lines $241_1$–$241_N$, each of which is a bidirectional transmission line such as an optical cable. The router 204A is provided with N line input port circuits $242_1$–$242_N$ and N line output port circuits $244_1$–$244_N$, which are connected to respective ones of the N transmission lines $241_1$–$241_N$.

An incoming packet at each of the N line input port circuits $242_1$–$242_N$ temporarily stored in a packet buffer 246 and is output to a line fault detector 247. The line fault detector 247 detects the occurrence of a line failure when receiving a packet including failure information indicating that the opposite end of each of the N transmission lines $241_1$–$241_N$ has not received any optical signal. The line fault detector 247 notifies a processor (CPU) 249 of a detection result indicating which transmission line fails.

The router 204A is further provided with a packet-protection information management table 251A, which is created based on packet protection information 253 received from the network management server 205 through a server interface circuit 252. The details of the packet-protection information management table 251A will be described later by referring to FIG. 7.

The header information of each of the packets stored in the packet buffer 246 is transferred to a header searcher 255. According to the header information of each packet, the header searcher 255, under control of the processor 249, searches the packet-protection information management table 251A for necessary information including protection information that indicates whether the packet in question is to be protected. In addition, the processor 249 notifies the header searcher 255 whether a failure occurs in the transmission line to which the packet is to be forwarded. The search result 255 is output to a header changer 256 and a packet distributor 257.

The header changer 256 sequentially inputs the packets from the packet buffer 246 and, as necessary, replaces the header information of each input packet with new one or adds new header information to the packet before transferring it to the packet distributor 257. The details will be described later.

The packet distributor 257 sequentially distributes the packets received from the header changer 256 to the N line output port circuits $241_1$–$244_N$ depending on the header information of each packet so that each packet is sent through a corresponding transmission line.

FORWARDING OPERATION AT INGRESS

Figure 4:
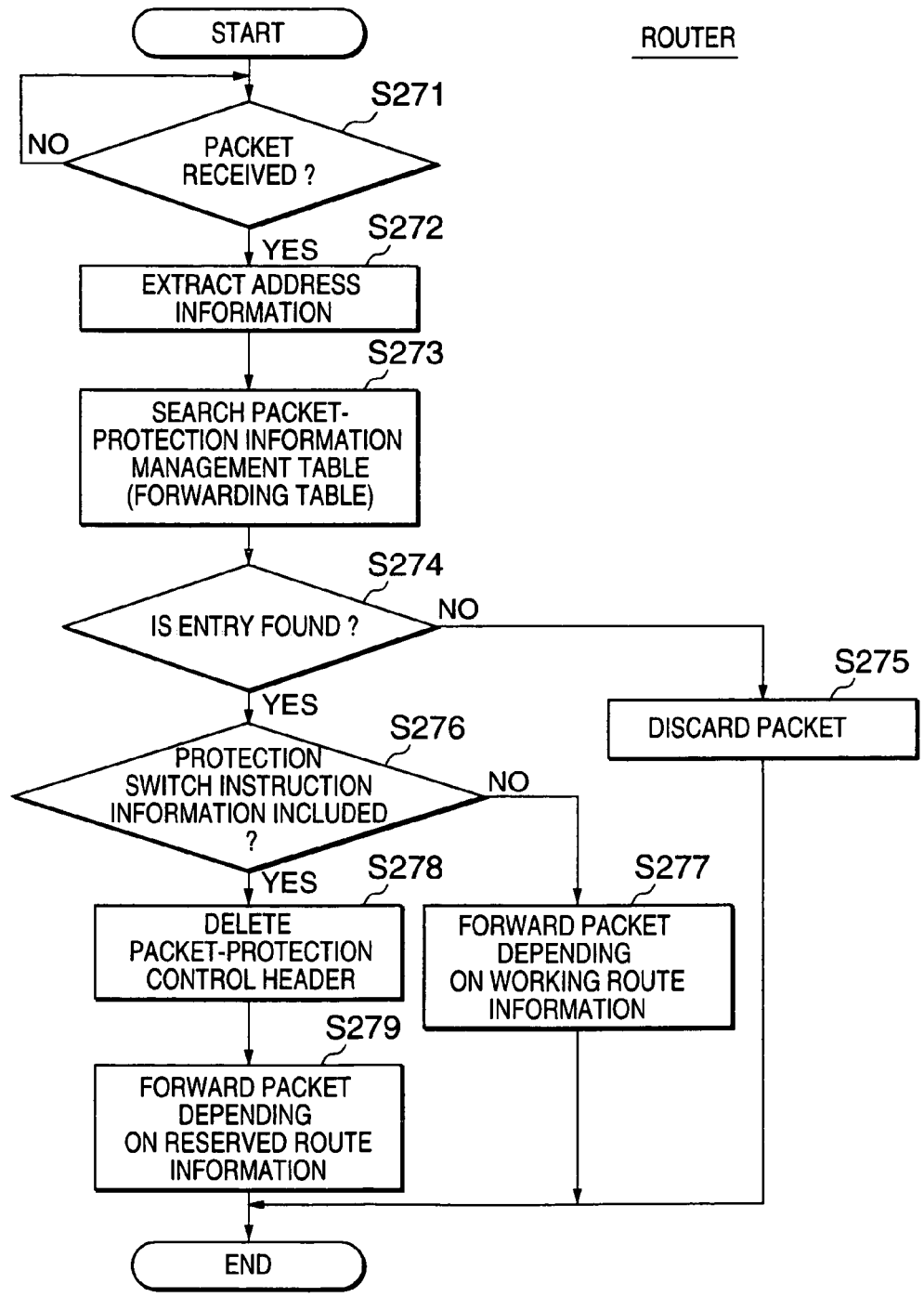
FIG. 4 is a flowchart showing a packet forwarding operation of an ingress router of the packet protection network according to the embodiment.

The forwarding operation at the ingress router 204A will be described by referring to FIGS. 4–7. First, packet formats and table contents will be described by referring to FIGS. 5–7 before the forwarding operation as shown in FIG. 4.

According to the present invention, in case of failure occurrence in a working route, a packet to be protected is sent back to the ingress router 204A so as to be forwarded to a reserved route around the failure, which will be described later.

In general, as shown in FIG. 5, a packet 210 has a predetermined format composed of a header field 291 and a data field 292. Header information including source address X, destination address Y, and data length is stored in the header field 291.

As shown in FIG. 6, a return packet 210A to be sent back to the ingress router 204A has a packet protection control header field 301 added to the normal header field 291. The packet protection control header field 301 is composed of an inverse header information field 302 and a protection switch instruction information field 303.

The inverse header information field 302 stores address information in which the source address is the original destination address Y and the destination address is the original source address X. The protection switch instruction information field 303 stores a 1-bit flag indicating whether the packet is a return packet 210A or a normal packet 210. Here, when the flag is set to 0, it indicates the normal packet 210, which is to be sent toward the egress router 204F. When the flag is set to 1, it indicates the return packet 210A, which is to be sent back to the ingress router 204A.

In FIG. 6, a return packet 210A has the packet protection control header field 301 and the normal header field 291 stacked. Therefore, the processor 249 can discriminate between the return packet 210A and the normal packet 210 by checking the header structure of a packet. However, such a discrimination procedure needs data storing step, data comparison step, and header structure check step, causing the speed of packet discrimination to be reduced.

In contrast, according to the embodiment of the present invention, the 1-bit protection switch instruction information indicates whether the packet is a return packet 210A or a normal packet 210. Therefore, high-speed and simplified packet discrimination can be achieved.

Referring to FIG. 7, the packet-protection information management table 251A has a protected flow information field 321, a working router information field 322, and a reserved route information field 323. Source and destination address information identifying each protected flow are stored in the protected flow information field 321.

For example, in the case of a protected flow identified by the source address X and destination address Y, the working route forwards the protected flow of packets to the router 204B indicated by "B" in the FIG. 7 and the reserved route is not available. On the other hand, in the case of a protected flow identified by the source address Y and destination address X, the working route forwards the protected flow of packets to the sending terminal 201 indicated by "X" and the reserved route forwards it to the router 204D indicated by "D".

Therefore, a protected packet 210 as shown in FIG. 5 is forwarded to the router 204B for the working route. When a protected packet 210A as shown in FIG. 6 has been sent back to the ingress router 204A due to the occurrence of a line failure, the protected packet 210A is forwarded to the router 204D for the reserved route. The forwarding procedure at the ingress router 204A will be described in detail hereinafter.

Hereafter, the forwarding operation of the router 204A will be described by referring to FIG. 4.

Referring to FIG. 4, at the ingress router 204A, each of the N line input port circuits $242_1$–$242_N$ is waiting for packets (step S271). When receiving a packet (YES at step S271), the received packet is stored in the packet buffer 246 and address information is extracted from the header information of the packet (step S272).

After extracting source and destination address information from the header field 291 of the packet 210, the header searcher 255 searches the packet-protection information management table 251A (step S273). If no entry is found in the packet-protection information management table 251A (NO at step S274), then the packet 210 is discarded (step S275) and the procedure is terminated.

When such an entry is found in the packet-protection information management table 251A (YES at step S274), it is further determined whether the protection switch instruction information is included in the header information field of the packet 210 (step S276). When no protection switch instruction information is included (NO at step S276), it is determined that the packet is a normal packet as shown in FIG. 5. Accordingly, the packet distributor 257 distributes the packet to the line output circuit for the working route determined depending on the working route information in the packet-protection information management table 251A (step S277).

When the protection switch instruction information is included (YES at step S276), the header changer 256 removes the packet protection control header 301 from the return packet 210A (step S278) and thereafter the packet distributor 257 distributes the resultant packet to the line output circuit for the reserved route determined depending on the reserved route information in the packet-protection information management table 251A (step S279).

Figure 8:
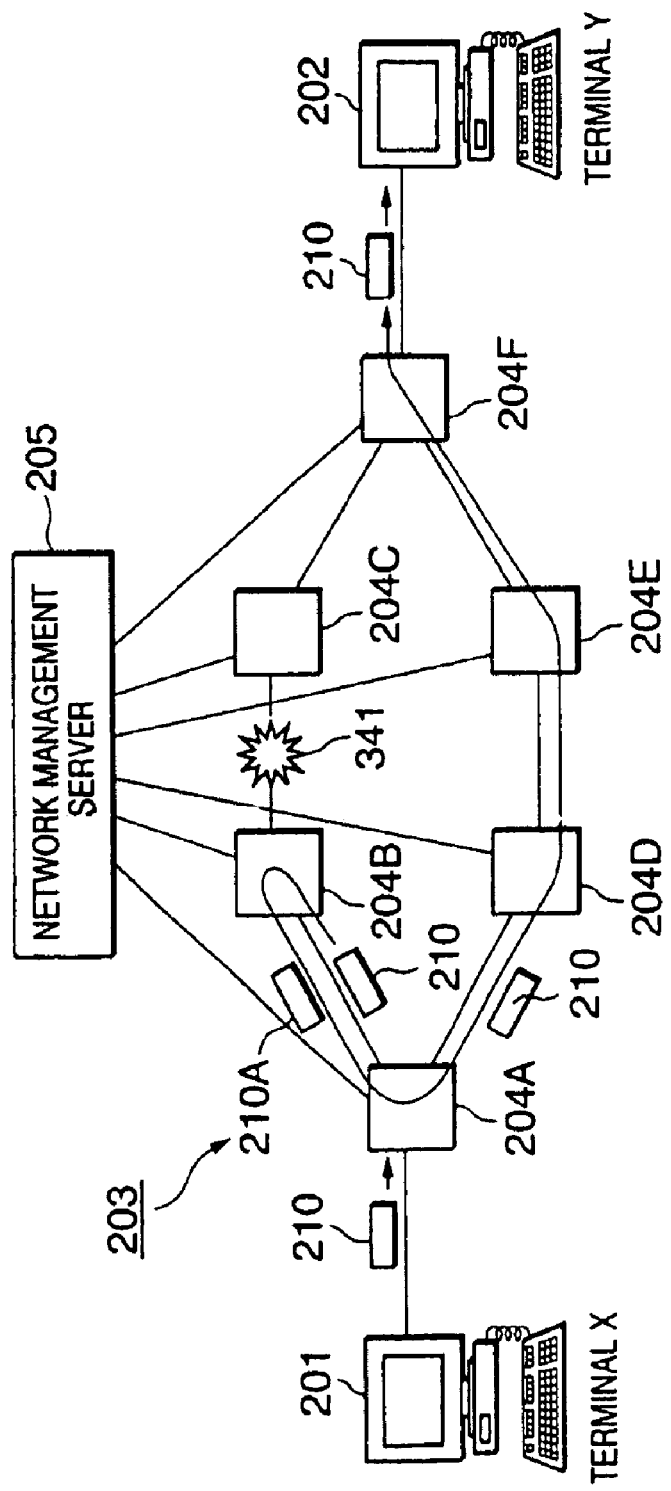
FIG. 8 is a schematic diagram showing an example of the packet protection network so as to explain an operation of a packet in case of failure occurrence according to the embodiment.

Referring to FIG. 8, it is assumed that a protected packet 210 enters the packet protection network 203 at the router 204A and thereafter a failure 341 occurs between the routers 204B and 204C on the working route.

In this case, the packet 210 is forwarded from the ingress router 204A to the router 204B on the working route. Since the packet 210 cannot be forwarded to the next hop (router 204C) due to the failure 341, the router 204B checks whether this packet is to be protected and, if so, adds the packet protection control header 301 to the packet 210 to produce a return packet 210A and sends it back to the start-point router 204A. The details will be describe later by referring to FIG. 10.

The start-point router 204A, when receiving the return packet 210A, deletes the packet protection control header 301 from the return packet 210A and forwards the resultant packet 210 to the router 204D on the reserved route. Since the reserved route is normally operating, the packet 210 travels through the reserved route and then successfully arrives at the end-point router 204F.

FORWARDING OPERATION AT TRANSIT ROUTER

Taking the router 204B as an example, the forwarding operation at a transit router will be described by referring to FIGS. 9 and 10. As described before, it is the same with other transit routers. First, the packet protection information management table 251B in the router 204B will be described.

Referring to FIG. 9, the packet-protection information management table 251B has a protected flow information field 321, a route information field 325, and a protection information field 326. Since the router 204B is set for a transit router in the packet protection network 203, it is not necessary for the route information field 325 to discriminate between the working and reserved routes. Source and destination address information identifying each protected flow are stored in the protected flow information field 321 as in the case of the ingress router 204A.

For example, in the case of a protected flow identified by the source address X and destination address Y, the protected flow of packets is forwarded to the router 204C indicated by "C" in the route information field 325. Since this packet flow is to be protected, the protection information indicates "YES".

On the other hand, in the case of a protected flow identified by the source address Y and destination address X, it indicates that this packet is a return packet 210A. Therefore, the protected flow of packets is forwarded to the ingress router 204A indicated by "A" and the protection information indicates "NO".

Figure 10:
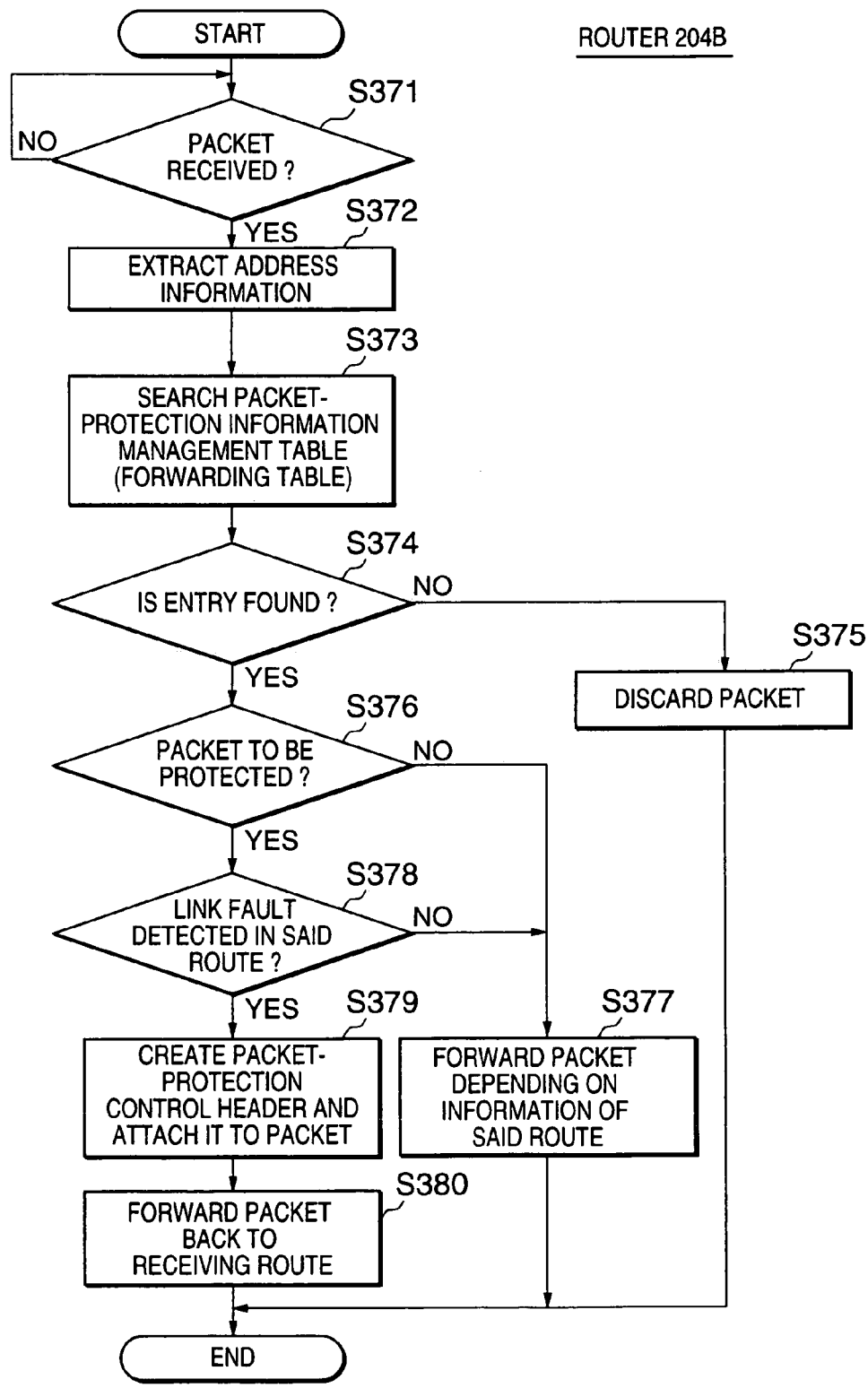
FIG. 10 is a flowchart showing a packet forwarding operation of the transit router of the packet protection network.

Referring to FIG. 10, at the router 204B, each of the N line input port circuits $242_1$–$242_N$ is waiting for packets (step S371). When receiving a packet (YES at step S371), the received packet is stored in the packet buffer 246 and address information is extracted from the header information of the packet (step S372).

After extracting source and destination address information from the header field 291 of the packet 210, the header searcher 255 searches the packet-protection information management table 251B (step S373). If no entry is found in the packet-protection information management table 251B (NO at step S374), then the packet 210 is discarded (step S375) and the procedure is terminated.

When such an entry is found in the packet-protection information management table 251B (YES at step S374), it is further determined whether the protection information indicates "YES", that is, the packet 210 is to be protected (step S376). When the packet 210 is not to be protected (NO at step S376), the packet distributor 257 distributes the packet 210 to the line output circuit for the route (here, router 204C) determined depending on the route information 325 in the packet-protection information management table 251B (step S377).

When it is determined that the packet 210 is to be protected (YES at step S376), the processor 249 determines from the fault detection information 248 whether a failure occurs in the said route (step S378). When no failure occurs, the packet distributor 257 distributes the packet 210 to the line output circuit for the route (here, router 204C) determined depending on the route information 325 in the packet-protection information management table 251B (step S377).

When it is determined that a failure occurs on the said route (YES at step S378), the header changer 256 creates the packet protection control header 301 and adds it to the packet 210 to produce a return packet 210A (step S379). Then, the packet distributor 257 distributes the return packet 210A to the line output circuit for the route at which the packet 210 has been received (step S380). That is, the return packet 210A is sent from the transit router 204B back to the start-point router 204A.

When the start-point router 204A has received the return packet 210A, as described before, since the protection switch instruction information is included (YES at step S276 of FIG. 4), the header changer 256 removes the packet protection control header 301 from the return packet 210A (step S278 of FIG. 4) and thereafter the packet distributor 257 distributes the resultant packet 210 to the line output circuit for the reserved route (step S279 of FIG. 4).

As described above, in the case where a protected packet 210 cannot be forwarded from the transit router 204B to the next hop router 204C due to the failure 341, the router 204B produces a return packet 210A from the packet 210 and sends it back to the ingress router 204A. The start-point router 204A, when receiving the return packet 210A, deletes the packet protection control header 301 from the return packet 210A and forwards the resultant packet 210 to the router 204D on the reserved route. Since the reserved route is normally operating, the packet 210 travels through the reserved route and then successfully arrives at the end-point router 204F. Accordingly, the packet 210 to be protected can be transferred to the destination terminal 202.

In this manner, packets conveying important information can be protected and, in case of occurrence of a failure on the working route, the packets to be protected are transferred through the reserved route to the destination at high speeds. Therefore, no substantial delay is generated and real-time data transmission can be achieved. Further, when normally operating, the reserved route is not used. Therefore, both the working and reserved routes are not concurrently used, avoiding undesired occupation of network bandwidth, resulting in improved efficiency in the use of network bandwidth.

In the above embodiment, the destination address of a return packet 210A is set to the source address of the packet 210 so as to send the return packet 210A back to the start-point router 204A. Alternatively, special information indicating that the packet is to be transferred through the reserved route may be written or added in the header information thereof. It is necessary to designate at least destination address of the ingress or the start-point router in the header information thereof so that transit routers transfer it toward the ingress or start-point router.

Although the simplified network as shown in FIG. 1 is taken as an example, the present invention is applicable to more complicate router networks. In such a large network, a plurality of reserved routes may be set in the network.

In the above embodiment, the above-described functions of the network management server 205 and the routers 204A–204F are implemented in part with software. Needless to say, the above-described functions may be implemented with software or hardware. In the case of the software used for implementation of the functions, the programs can be recorded into a recording medium or can be transmitted through the network.

The invention claimed is:

1. A restoration method for restoring a flow of packets in a packet transfer network composed of a plurality of routers, comprising the steps of:
   a) setting a working route and a reserved route in the packet transfer network, wherein the reserved route branches from the working route at a start-point router;
   at each of routers other than the start-point router on the working route,
   b) determining whether a failure occurs in a link to a next-hop router on the working route;
   c) determining whether an incoming packet is to be protected or is not to be protected;
   d) when a packet to be protected is received in case of occurrence of the failure, sending the packet to be protected back to the start-point router, and when a packet which is not to be protected is received in case of occurrence of the failure, the packet not to be protected is not sent back to the start point router; and
   at the start-point router,
   e) when receiving back the packet to be protected, forwarding it to the reserved route.

2. The restoration method according to claim 1, wherein, when the start-point router receives a packet to be protected in case of occurrence of the failure, the start-point router forwards it to the reserved route.

3. The restoration method according to claim 1, wherein the working and reserved routes are set by a network management server controlling each of the routers in the packet transfer network.

4. The restoration method according to claim 1, wherein the step (d) comprises the steps of:
   d.1) when a packet to be protected is received in case of occurrence of the failure, adding a protection control header to the packet to be protected to produce a return packet; and
   d.2) sending the return packet back to the start-point router, and the step (e) comprises the steps of:
   e.1) receiving the return packet back from a next-hop router on the working route;
   e.2) removing the protection control header from the return packet to produce an original packet to be protected; and
   e.3) forwarding the original packet to the reserved route.

5. A packet transfer network comprising:
   a plurality of routers; and
   a network management server for designing a packet protection network in which a working route and a reserved route are set by controlling designated routers which are involved in the working and reserved routes, wherein the reserved route branches from the working route at a start-point router,
   wherein each of a plurality of designated routers forming the working route, comprises:
   a line failure detector for detecting a failure occurring in a link to a next-hop router on the working route;
   a table for storing information indicating where a packet to be protected is forwarded to; and
   a packet distribution controller for, when a packet to be protected is received in case of occurrence of the failure, forwarding the packet to be protected depending on the information stored in the table, and when a packet not to be protected is received in case of occurrence of the failure, not forwarding the packet not to be protected,
   wherein the designated routers other than the start-point router forwards the packet to be protected back to the start-point router in case of occurrence of the failure, wherein the start-point router forwards the packet to be protected received back from another router to the reserved route.

6. The packet transfer network according to claim 5, wherein the start-point router is an ingress router to the packet protection network.

7. The packet transfer network according to claim 5, wherein the network management server transfers the information of the table to each of the designated routers depending on which one of the start-point router and a transit router the designated router is.

8. A router in a packet protection network in which a working route and a reserved route are set by controlling designated routers which are involved in the working and reserved routes, wherein the reserved route branches from the working route at a start-point router, comprising:

a line failure detector for detecting a failure occurring in a link to a next-hop router on the working route;

a table for storing information indicating where a packet to be protected is forwarded to; and a packet distribution controller for, when a packet to be protected is received in case of occurrence of the failure, forwarding the packet to be protected depending on the information stored in the table, and when a packet not to be protected is received in case of occurrence of the failure, not forwarding the packet not to be protected.

wherein the designated routers other than the start-point router forwards the packet to be protected back to the start-point router in case of occurrence of the failure, wherein the start-point router forwards the packet to be protected received back from another router to the reserved route.

9. The router according to claim 8, wherein the start-point router is an ingress router to the packet protection network.

10. The router according to claim 8, wherein the information of the table in each of the designated routers is downloaded from a network management server of the packet protection network depending on which one of the start-point router and a transit router the designated router is.

11. A recording medium storing a computer-readable program for instructing a computer to restore a flow of packets in a packet transfer network composed of a plurality of routers, the computer-readable program comprising the steps of:

at a network management server, a) setting a working route and a reserved route in the packet transfer network, wherein the reserved route branches from the working route at a start-point router;

at each of routers other than the start-point router on the working route, b) determining whether a failure occurs in a link to a next-hop router on the working route;

c) determining whether an incoming packet is to be protected, or is not to be protected;

d) when a packet to be protected is received in case of occurrence of the failure, sending the packet to be protected back to the start-point router, and when a packet which is not to be protected is received in case of occurrence of the failure, the packet not to be protected is not sent back to the start point router; and at the start-point router, e) when receiving back the packet to be protected, forwarding it to the reserved route.

* * * * *

UNITED STATES PATENT AND TRADEMARK OFFICE
CERTIFICATE OF CORRECTION

PATENT NO. : 7,075,889 B2
APPLICATION NO. : 09/740993
DATED : July 11, 2006
INVENTOR(S) : Kenichi Shiozawa It is certified that error appears in the above-identified patent and that said Letters Patent is hereby corrected as shown below:

Col. 3, line 60, delete "204F", insert --204E--.

Signed and Sealed this

Twentieth Day of February, 2007

JON W. DUDAS
*Director of the United States Patent and Trademark Office*